United States Patent [19]
Gimmler et al.

[11] Patent Number: 6,102,002
[45] Date of Patent: Aug. 15, 2000

[54] METHOD FOR ADJUSTMENT OF A THROTTLE VALVE AND/OR INJECTION QUANTITY

[75] Inventors: Helmut Gimmler, Schwaikheim; Andreas Heidinger, Winterbach; Klaus Peter Kuhn, Plüderhausen, all of Germany

[73] Assignee: Daimler Benz Aktiengesellschaft, Stuttgart, Germany

[21] Appl. No.: 09/118,235

[22] Filed: Jul. 17, 1998

[30] Foreign Application Priority Data

Jul. 18, 1997 [DE] Germany .......................... 197 30 906

[51] Int. Cl.$^7$ ........................................ F02D 9/00
[52] U.S. Cl. .......................... 123/399; 123/675; 701/110
[58] Field of Search .................... 123/396, 399, 123/675, 492, 493, 486; 701/110

[56] References Cited

U.S. PATENT DOCUMENTS

| | | | |
|---|---|---|---|
| 4,470,396 | 9/1984 | Hasumi et al. | 123/399 |
| 4,597,049 | 6/1986 | Murakami. | |
| 4,771,752 | 9/1988 | Nishimura et al. | 123/399 |
| 4,853,720 | 8/1989 | Onari et al. | 701/110 |
| 5,431,139 | 7/1995 | Grutter et al. | 123/399 |

FOREIGN PATENT DOCUMENTS

| | | |
|---|---|---|
| 38 44 353 | 7/1990 | Germany. |
| 35 04 197 | 1/1991 | Germany. |
| 44 01 416 | 7/1996 | Germany. |
| 61-261635 | 11/1986 | Japan. |
| 1-113541 | 5/1989 | Japan. |
| 1-257742 | 10/1989 | Japan. |
| 7-133733 | 5/1995 | Japan. |

*Primary Examiner*—Erick Solis
*Attorney, Agent, or Firm*—Kenyon & Kenyon

[57] ABSTRACT

A method for adjusting the throttle and/or injection quantity of a motor vehicle combustion engine at the command of a vehicle driver, an adaption being made to the vehicle driver's driving style, the curve of angle throttle position and/or injection quantity over accelerator pedal position angle exhibiting a progressive characteristic when there is driving behavior recognized as conservative and a degressive characteristic when there is driving behavior recognized as sporty.

14 Claims, 3 Drawing Sheets

METHOD FOR ADJUSTMENT OF A THROTTLE VALVE AND/OR INJECTION QUANTITY

FIELD OF THE INVENTION

The present invention concerns a method for adjusting the throttle and/or injection quantity of a motor vehicle combustion engine as an input of a vehicle driver.

RELATED TECHNOLOGY

Adaptive engine systems which adapt to the driving style of a driver are disclosed, for example, in German Patent Application No. 44 01 416 A1, according to which, the vehicle driver's individual driving style is evaluated. According to the method described in German Patent Application No. 44 01 416 A1, the evaluation basically includes evaluating the accelerations measured in the lengthwise and transverse directions of the vehicle. From the heretofore methods described in German Patent Application No. 44 01 416 A1, evaluating the driving style of the vehicle driver by the type of actuation of, among other things, the accelerator pedal is disclosed. Consideration of individual driving style then occurs in that an intervention can be made into engine/transmission management depending on the evaluation.

SUMMARY OF THE INVENTION

According to the present invention, the characteristic curve of throttle angle position or injection quantity over the accelerator pedal angle position exhibits a progressive characteristic during driving behavior recognized as conservative and a degressive characteristic during driving behavior recognized as sporty.

A progressive characteristic particularly indicates that for small accelerator pedal angles there is a flat rise and there is a greater rise only for greater angles. Accordingly, the degressive characteristic in driving behavior recognized as sporty indicates in particular that at small accelerator pedal angles, at first there is a steep rise which flattens out with greater accelerator pedal angles.

Advantageously, because of this, during conservative driving behavior where the command is derived from the accelerator pedal position, the angle range of throttle position or the injected quantity normally set by the vehicle driver is assigned a greater angle range of accelerator position. Because of this, metering that feels more sensitive is possible with conservative driving behavior. In addition, advantageously during driving behavior that is recognized as sporty, larger throttle angle range and/or injection quantity is assigned to similarly small accelerator pedal angle settings. Because of this, a similarly more agile metering behavior during sporty driving is possible when there is driving behavior that is recognized as sporty.

In conventional systems, with a fixed curve, dimensioning in the sense of similarly sensitive metering can only be realized with restrictions. In fact, if the system is adjusted to a vehicle driver with conservative driving behavior, the fine sensitivity of the metering is thus impaired for a vehicle driver with more sporty driving behavior. Similarly, the fine sensitivity of metering is impaired for a vehicle driver with conservative driving behavior if the system is designed for a vehicle driver with sporty driving behavior.

In a further adaptation of the present method, at least one intermediate value exists for driving behavior recognized as being situated between driving behavior recognized as conservative and driving behavior recognized as sporty. For this at least one intermediate value, there also exists a curve which lies between the curve with the progressive characteristic for driving behavior recognized as conservative and the curve with the degressive characteristic for driving behavior recognized as sporty.

In this way, at least one more level is possible for finer adjustment to the driving behavior of the vehicle driver.

Furthermore, driving behaviors between driving behavior recognized as conservative (in other words steady) and driving behavior recognized as sporty may be graduated continuously. The assignment of curves is also continuous.

Because of this, a subdivision of the individual driving behaviors of individual vehicle drivers that is still more differentiated and the appropriate curve assignment becomes possible.

Yet further, the curves may be varied depending on vehicle speed. This advantageously considers driving resistance. With conservative driving behavior, for example, curve a in FIG. 3 may be only permitted at speeds less than 100 km/h since at high speeds driving resistance adequately retards the vehicle. During driving behavior recognized as sporty, for example, at speeds greater than 100 km/h, only dynamic curve b of FIG. 3 may be permitted. The increase in dynamic response is continuously reduced as the speed drops in order to make it possible to control the vehicle even here.

The accelerator position may used as a command from the vehicle driver, while the signal for this accelerator position is subject to low-pass filtering that is clearly perceptible in the driving performance, at least under certain conditions.

Because of this, abrupt changes in driving performance can be advantageously prevented. This increases driving comfort.

One of the specific certain conditions includes that the recognized driving behavior lies below a specific threshold value of a driving behavior recognized as sporty.

Because of this, low-pass filtering occurs only during a driving style that is more conservative. Thus higher driving comfort can be achieved corresponding to the driving style of the vehicle driver with a conservative driving style, and with a more sporty driving style there is a more dynamic response of the vehicle upon accelerator actuation by the vehicle driver.

Another of the specific conditions may be that the accelerator pedal is not returned or released at a speed lying above a specific threshold. This advantageously permits a request for a relatively substantial vehicle deceleration to be implemented without time delay.

Low-pass filtering parameters may be set depending on the recognized driving behavior. Thus the relationship between driving comfort and dynamic response of the vehicle to accelerator pedal actuation by the vehicle driver can be adjusted more precisely depending on the degree of conservative driving behavior and/or a tendency for sportier driving behavior.

A variable may used as an input by the vehicle driver that is formed by considering the accelerator pedal position and, at least under certain circumstances, the time derivative of the accelerator pedal position. The accelerator pedal actuation dynamics upon command from the vehicle driver thus can advantageously be considered.

The specific certain circumstances can include the fact that the recognized driving behavior lies above a specific threshold for sporty driving behavior. Because of this, consideration of the dynamics can advantageously be prevented in the case of conservative driving behavior.

The time derivative of accelerator pedal position may be increasingly considered for the variable formation, as the driving behavior is increasingly recognized as sporty. Due to this, dynamics will be increasingly considered as driving behavior increasingly becomes sportier.

During a spontaneous dynamic response request by the vehicle driver that is recognized independently of previously recognized driving behavior, the throttle setting and/or injection quantity may depend on the spontaneous dynamic request, independently of the previously used curve based on recognized driving behavior.

This has an especially advantageous effect during conservative driving behavior. Because of the curve characteristic, in fact, the vehicle driver would have to actuate the accelerator pedal far enough until he achieves an appropriate setting of the throttle and/or injection quantity based on the curve characteristic. If vehicle acceleration is desired, this can result in a delay. This is advantageously prevented by recognition of a spontaneous dynamic response request. Recognition of the spontaneous dynamic response request can occur, e.g., by a method that has been described in commonly-assigned German Patent Application No. 19729251.8, which is hereby incorporated by reference herein, and in the corresponding U.S. patent application, filed on Jul. 9, 1998, entitled "Method for Recognizing a Spontaneous Demand by a Driver of a Motor Vehicle for a Dynamic Response," which is also hereby incorporated by reference herein.

With a recognized spontaneous dynamic response request, the medium driving behavior curve (for example, curve c in FIG. 3) may be used as the characteristic curve. Because of this, a similarly greater vehicle acceleration can be set more quickly.

BRIEF DESCRIPTION OF THE DRAWINGS

One embodiment of the present invention is shown in more detail in the drawings. In particular.

DETAILED DESCRIPTION

Figure 1:
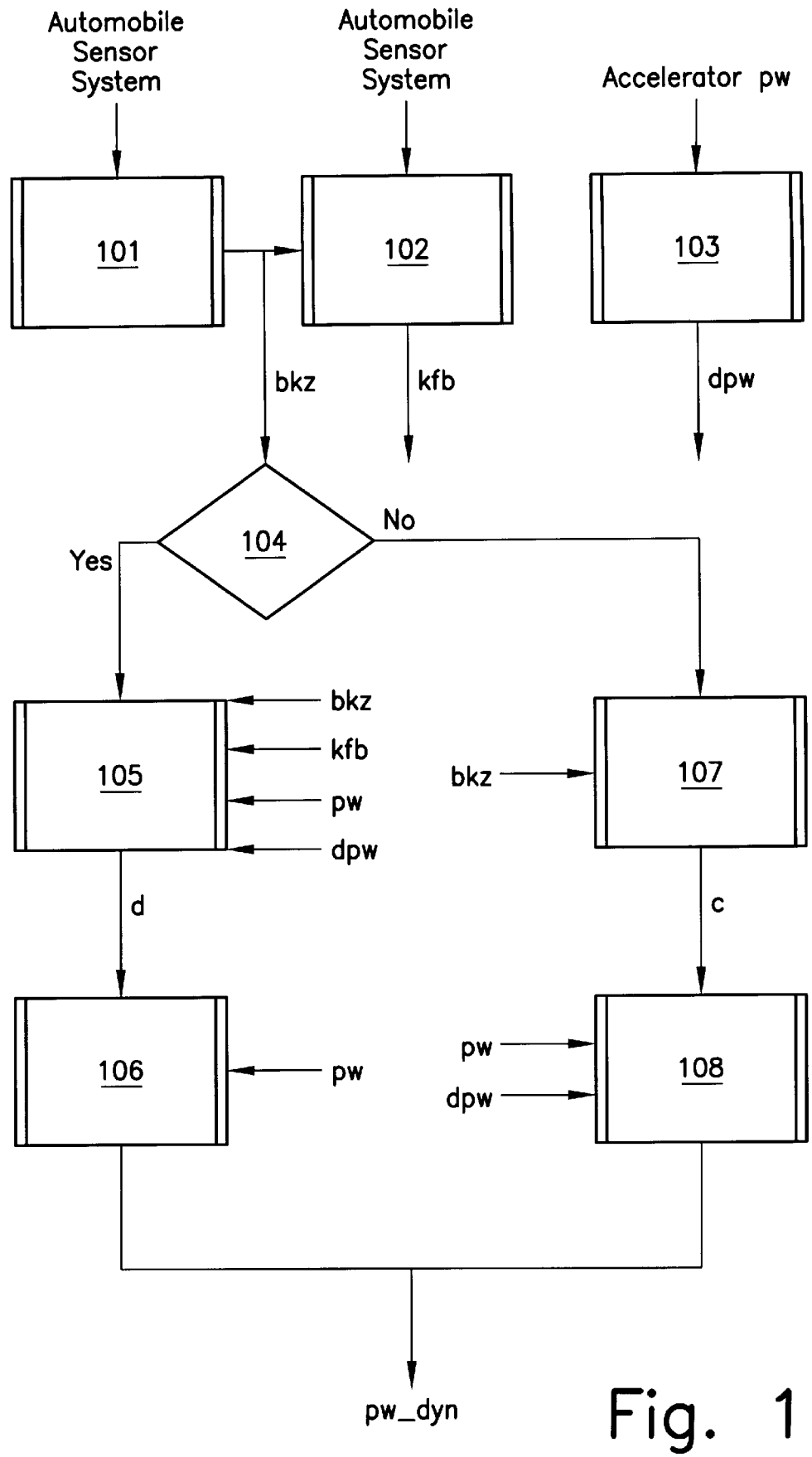
FIG. 1 shows one embodiment in the form of a block diagram for considering dynamic variation of the assignment of accelerator pedal position to throttle position and/or to injection quantity which may be carried out for example, using a microprocessor having inputs from a vehicle sensor system and the accelerator pedal.

FIG. 1 shows a block diagram that considers dynamic variation of the assignment of accelerator pedal position to throttle position and/or to injection quantity. In Block 101, first the individual vehicle driver's driving style is determined. Therefore, in this block there is also a recognition of driving behavior. This can be carried out, e.g., according to the method described in German Patent Application No. 44 01 416 A1, which advantageously uses the longitudinal acceleration parameter biz of the method described there and which is hereby incorporated by reference herein. However, it is also basically possible to use other methods for rating driving behavior between conservative and sporty.

In addition, it can be seen that in Block 102 there is an evaluation that recognizes a spontaneous dynamic response request from the vehicle driver. This can be carried out, for example, according to the method described in incorporated-by-reference German Patent Application No. 19729251.8 and its corresponding U.S. Patent Application. In these documents, a variable kfb is determined for recognizing a spontaneous dynamic response request and therefore Block 102 is an abbreviated representation of the method described in these documents. If a spontaneous dynamic response request has been recognized, assignment of the vehicle driver's command is set by the accelerator pedal position independently of previously recognized driving behavior.

In Block 103, the change dpw of the accelerator position over time is formed from accelerator pedal position pw.

In Block 104, the driving behavior recognized is compared to a specified threshold value. In the embodiment shown, variable bkz is used for recognizing driving behavior so that in Block 104 a comparison takes place between this variable bkz and a specified threshold value of this variable bkz.

In this comparison, if variable bkz is less than the threshold value, the process continues with Block 105. The signal representing accelerator pedal position is damped. Advantageously, this damping d—as shown in Block 105—can be influenced by other variables. For example, damping d can be applied depending on the driving behavior that is recognized as more conservative or more sporty. Also it is possible to determine damping d depending on variable kfb, with the help of which a spontaneous dynamic response request is recognized. Also damping d can be determined as a function of accelerator pedal position pw and/or the time derivative of accelerator position dpw.

The process then continues in Block 106, in which the accelerator pedal signal is damped. For further adjustment of the throttle and/or injection quantity, pw_dyn is then used.

An object of damping in Blocks 105 and 106 is to set a greater damping, the more conservative the vehicle driver's driving behavior is. If a quick pedal release or pedal zero position occurs, damping is switched off immediately in order to initiate the desired vehicle deceleration without delay.

If it has been determined in Block 104 that variable bkz is greater than the threshold of bkz, variable pw_dyn is formed in that the time derivative of accelerator pedal dpw, multiplied by variable c, is added to accelerator pedal position pw.

Variable c can, for example, be varied in Block 107 depending on the driving behavior recognized. With increasingly sporty driving behavior, this variable becomes greater resulting in faster vehicle response to a change in accelerator pedal position in the direction of acceleration.

In Block 108 then, variable pw-dyn is determined by addition of accelerator pedal position and the change in accelerator pedal position over time multiplied by variable c:

$$pw\_dyn = pw + c^* \, dpw.$$

Naturally, adapting the parameters to the recognized driving behavior without checking in Block 104 in such a way that damping continuously approaches 0 with increasingly sporty driving behavior and variable c approaches 0 with increasingly conservative driving behavior lies within the scope of the present invention.

Figure 2:
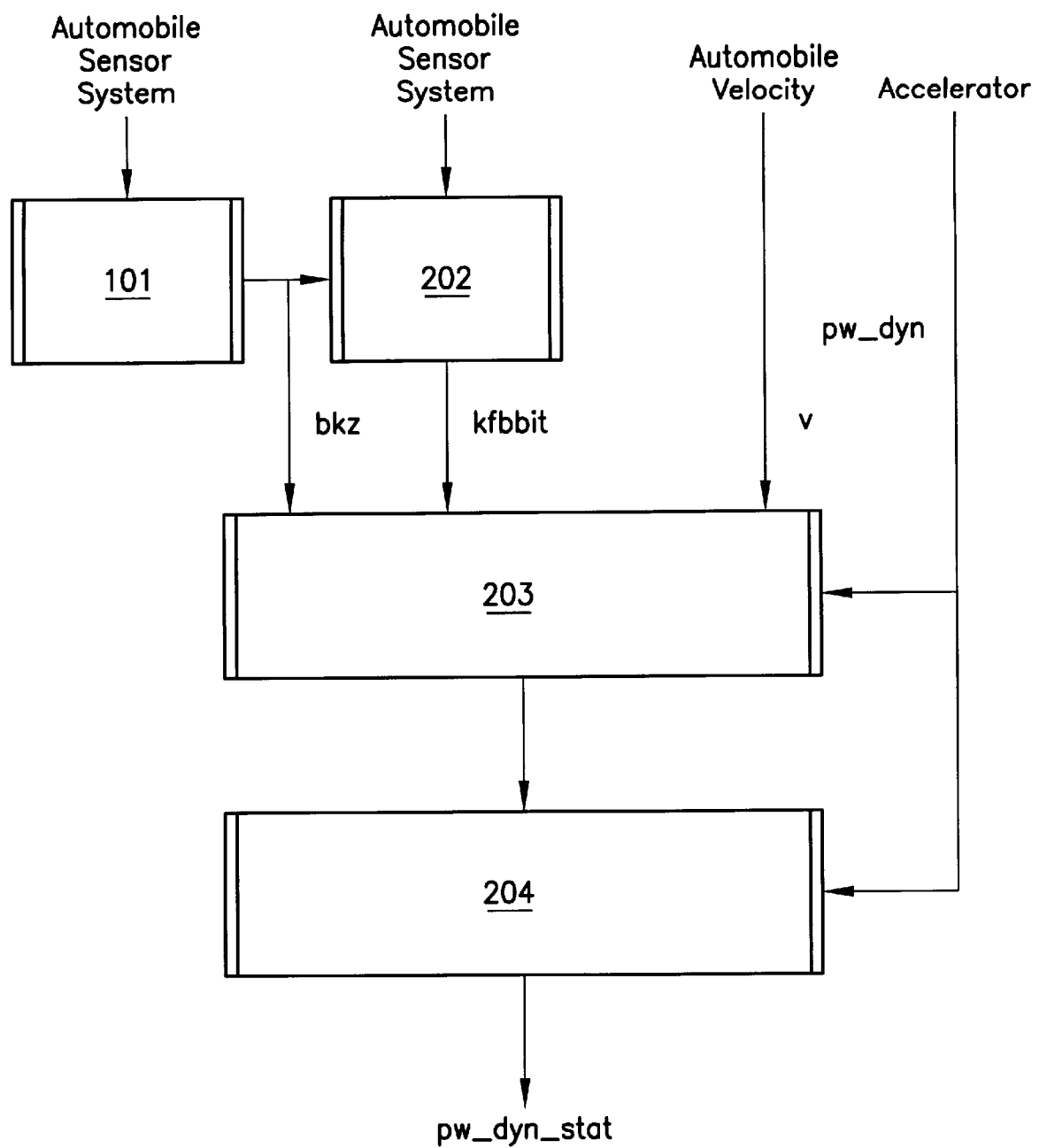
FIG. 2 shows one embodiment in the form of a block diagram for considering static variation of the assignment of accelerator pedal position to throttle position and/or injection quantity.

FIG. 2 shows an embodiment of a block diagram for considering static variation in assignment of the accelerator pedal position to throttle position and/or to injection quantity.

Block 101 corresponds to Block 101 in FIG. 1. Here as well, driving behavior is evaluated and recognized as more conservative or more sporty. In the embodiment in FIG. 2, acceleration identifier biz is also used for further evaluation.

In Block 202, the spontaneous dynamic response request is recognized according to the method described in incorporated-by-reference German Patent Application No. 19729251.8 and its also incorporated-by-reference corresponding U.S. Patent Application. Variable kfbbit characterizes whether a spontaneous dynamic response request is present or not.

In addition, signal v representing vehicle speed is supplied to Block 203, as well as the signal of accelerator pedal position representing the vehicle driver's command that was determined as variable pw_dyn as shown in FIG. 1.

If a spontaneous dynamic response request is present (kfbbit set), for example, at least center curve c is used in order to ensure appropriately dynamic vehicle response without additional consideration of previously recognized driving behavior.

Figure 3:
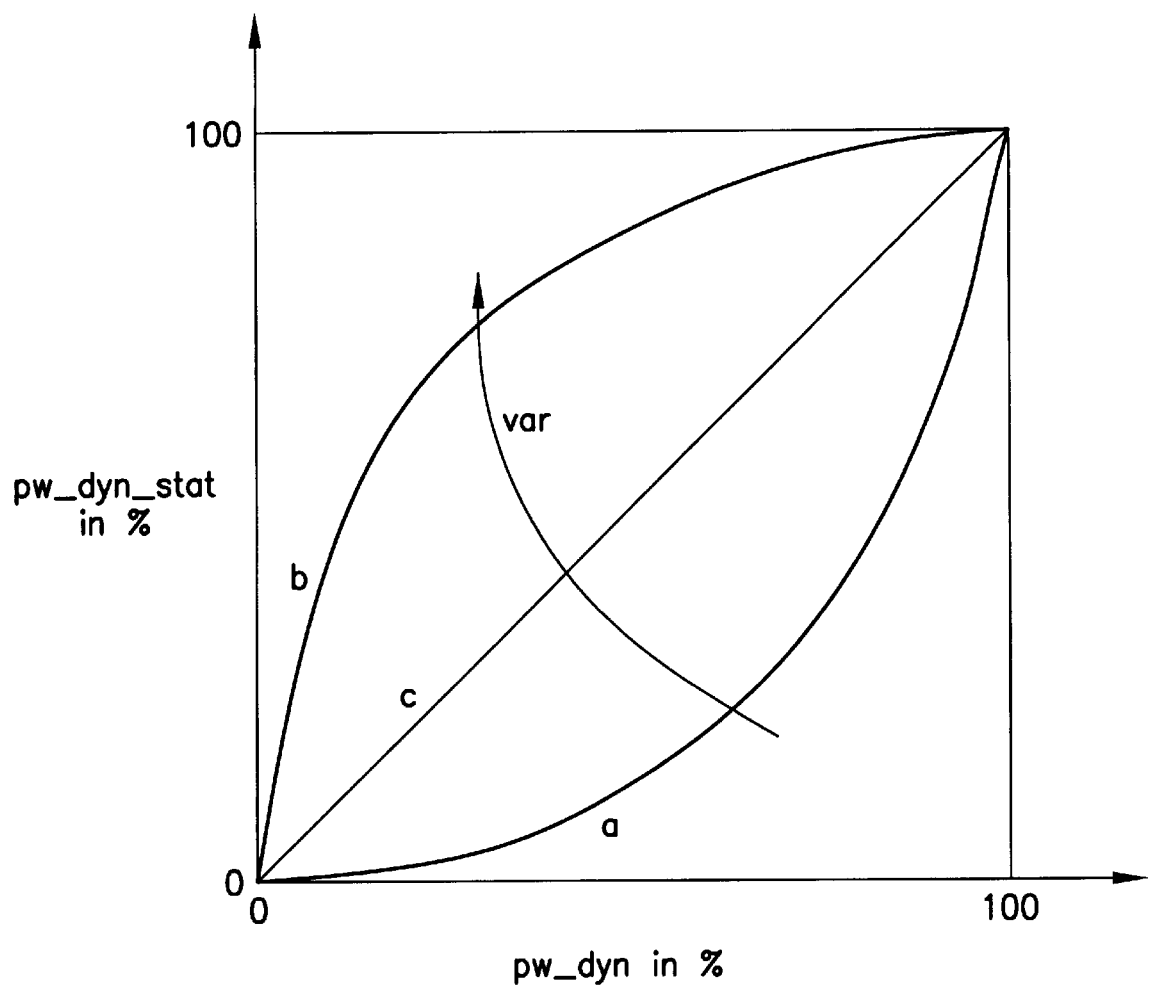
FIG. 3 shows a set of curves for carrying out static variation of assignment of accelerator pedal position to throttle position and/or injection quantity.

If bit kfbbit has not been set, a curve can be evaluated using the driving behavior recognized. In FIG. 3, for example, a few curves are shown that will be described in more detail in the following.

Furthermore, the curve corresponding to vehicle speed can be varied to consider driving resistance. For example, with conservative driving behavior, curve a in FIG. 3 may be permitted only at speeds less than 100 km/h, since at high speeds driving resistance adequately retards the vehicle. During driving behavior recognized as sporty, for example, at speeds greater than 100 km/h, only dynamic curve b of FIG. 3 may be permitted. The increase in dynamic response is continuously reduced as the speed drops in order to make it possible to control the vehicle even here.

In step 204, adjustment of throttle and/or injection quantity is carried out using variable pw_dyn that has been determined.

FIG. 3 shows a set of curves for carrying out static variation of assignment of accelerator pedal position to throttle position and/or to injection quantity.

The selection of curves is carried out according to the degree of curve variation var determined in step 203 for driving behavior recognized as conservative or sporty. The direction of the arrow for variable var shows the selection of the curve with driving behavior recognized as increasingly sporty.

Curve a corresponds to conservative driving behavior, curve b to sporty driving behavior and curve c to medium driving behavior.

In FIG. 3, variable pw_dyn stat is plotted against variable pw_dyn. For example, the throttle position and/or the injection quantity can be directly proportional to variable pw_dyn stat (curve c).

Thus it also proves to be advantageous that particularly good consideration of the driving behavior recognized is possible if both assignment of throttle position and/or injection quantity to accelerator pedal position is carried out depending on the driving behavior recognized, as well as an assignment of throttle position and/or of injection quantity to the change in accelerator pedal position over time depending on recognized driving behavior.

What is claimed is:

1. A method for adjusting control of a motor vehicle internal combustion engine as a function of an input of a vehicle driver, the method comprising:

determining a driving style of the driver based on a driving behavior of the driver and adjusting a throttle valve position and/or injection quantity as a function of an accelerator pedal position and the driving style of the driver, a characteristic curve of the throttle position and/or injection quantity in relation to the accelerator pedal position having a progressive characteristic for a conservative driving style and a degressive characteristic for a sporty driving style.

2. The method as recited in claim 1 wherein at least one value exists corresponding to an intermediate driving style, the intermediate driving style being between the sporty driving style and the conservative driving style, the characteristic curve for the at least one intermediate value lying between the characteristic curve having the progressive characteristic for the conservative driving style and the characteristic curve having the degressive characteristic for the sporty driving style.

3. The method as recited in claim 2 wherein the driving style includes a graduation of driving styles between the conservative driving style and the sporty driving style, and a determination of the gradation being carried out continuously and the characteristic curve being assigned continuously as a function of the driving style.

4. The method as recited in claim 1 wherein the characteristic curve also is a function of vehicle speed.

5. The method as recited in claim 1 wherein a signal is formed corresponding to the accelerator pedal position, the signal being subject to low-pass filtering at least under specific conditions.

6. The method as recited in claim 5 wherein one of the specific conditions is that a variable corresponding to the driving style is less than a specific threshold value corresponding to the sporty driving style.

7. The method as recited in claim 5 wherein one of the specific conditions is that an accelerator pedal is not retracted at a vehicle speed greater than a specific threshold.

8. The method as recited in claim 5 wherein parameters of the low-pass filtering are adjusted as a function of the driving style.

9. The method as recited in claim 1 further comprising the step of forming a variable as a function of the accelerator pedal position.

10. The method as recited in claim 9 wherein the variable is also a function of a time derivative of the accelerator pedal position under certain conditions.

11. The method as recited in claim 10 wherein the certain conditions include when another variable corresponding to the driving style exceeds a threshold corresponding to the sporty driving style.

12. The method as recited in claim 10 wherein time derivative of the accelerator pedal position influences the variable more, the sportier the driving behavior.

13. The method as recited in claim 1 wherein when a spontaneous dynamic request from the vehicle driver is recognized, the throttle and/or injection quantity is adjusted as a function of the spontaneous dynamic response request, independently of the characteristic curve currently used.

14. The method as recited in claim 13 wherein when the spontaneous dynamic response is recognized, the characteristic curve is changed to a curve corresponding to an intermediate driving style.

* * * * *